(12) United States Patent
Gushulak (10) Patent No.: US 10,876,362 B2
(45) Date of Patent: Dec. 29, 2020

(54) THREADED JOINT FOR COUPLING RODS

(71) Applicant: Diversity Technologies Corporation, Edmonton (CA)

(72) Inventor: Richie Gushulak, Edmonton (CA)

(73) Assignee: DIVERSITY TECHNOLOGIES CORPORATION, Edmonton (CA)

( * ) Notice: Subject to any disclaimer, the term of this patent is extended or adjusted under 35 U.S.C. 154(b) by 944 days.

(21) Appl. No.: 15/534,118

(22) PCT Filed: Sep. 2, 2015

(86) PCT No.: PCT/CA2015/050842
§ 371 (c)(1),
(2) Date: Jun. 8, 2017

(87) PCT Pub. No.: WO2016/033687
PCT Pub. Date: Mar. 10, 2016

(65) Prior Publication Data
US 2018/0010402 A1  Jan. 11, 2018

Related U.S. Application Data (60) Provisional application No. 62/045,332, filed on Sep. 3, 2014.

(51) Int. Cl.
| | | |
|---|---|---|
| *E21B 17/042* | (2006.01) | |
| *F16L 15/00* | (2006.01) | |
| *F16L 15/06* | (2006.01) | |

(52) U.S. Cl.
CPC ........ *E21B 17/0423* (2013.01); *E21B 17/042* (2013.01); *F16L 15/002* (2013.01); *F16L 15/06* (2013.01)

(58) Field of Classification Search
CPC ................................ F16L 15/002; F16L 15/06
See application file for complete search history.

(56) References Cited

U.S. PATENT DOCUMENTS

| | | |
|---|---|---|
| 4,570,982 A | 2/1986 | Blose et al. |
| 4,662,659 A | 5/1987 | Blose et al. |
| (Continued) | | |

OTHER PUBLICATIONS

International Search Report and Written Opinion from Corresponding Application No. PCT/CA2015/050842; dated Dec. 1, 2015.

(Continued)

*Primary Examiner* — Matthew Troutman
*Assistant Examiner* — Fannie C Kee
(74) *Attorney, Agent, or Firm* — Pearne & Gordon LLP (57) ABSTRACT

The application relates to a threaded cylindrical member, which may be used for a segmented drilling tube. The member has opposing first and second ends and a central axis between the ends. The first end is threaded with a pin thread including a pressure flank, a crest and a root. The second end is threaded with a box thread including a pressure flank, a root, wherein the pin and box threads are configured whereby when threaded together a portion of the root of the pin thread is out of contact with the crest of the box thread to leave gap therebetween. The secondary geometries of the pin and box threads are configured to generate an interference fit between the pin and box threads. The roots and crests of the pin and box threads define parallel tapering conical frustrums that differ from each other in their taper angles.

21 Claims, 5 Drawing Sheets

(56) References Cited

U.S. PATENT DOCUMENTS

| | | | |
|---|---|---|---|
| 5,788,401 A † | 8/1998 | Drenth |
| 6,485,063 B1 † | 11/2002 | Olivier |
| 6,609,735 B1 | 8/2003 | DeLange et al. |
| 7,452,007 B2 | 11/2008 | Hashem et al. |
| 7,458,616 B2 | 12/2008 | Reynolds, Jr. |
| 7,717,478 B2 | 5/2010 | Reynolds, Jr. |
| 7,810,849 B2 | 10/2010 | Reynolds, Jr. |
| 7,828,337 B2 | 11/2010 | Reynolds, Jr. |
| 7,942,454 B2 | 5/2011 | Reynolds, Jr. |
| 8,668,233 B2 | 3/2014 | Mallis et al. |
| 2006/0145477 A1 | 7/2006 | Reynolds, Jr. |
| 2007/0132239 A1 | 6/2007 | Reynolds, Jr. |
| 2007/0158943 A1 | 7/2007 | Mallis et al. |
| 2007/0216160 A1 | 9/2007 | Reynolds, Jr. |
| 2008/0054633 A1 | 3/2008 | Reynolds |
| 2010/0156099 A1 | 6/2010 | Reynolds, Jr. |
| 2012/0013123 A1 † | 1/2012 | Back |
| 2014/0102808 A1 † | 4/2014 | Drenth |

OTHER PUBLICATIONS

International Preliminary Report on Patentability from Corresponding Application No. PCT/CA2015/050842; dated Mar. 7, 2017.

† cited by third party

THREADED JOINT FOR COUPLING RODS

FIELD OF THE INVENTION

This invention pertains to threaded tubes and rods such as tubes and casings used for subsurface drilling. The invention relates in particular to threaded joints for coupling together segmented tubes and rods such as thin wall threaded drill rods and casings used in surface and underground drilling in the mineral exploration industry using diamond core drill bits, as well as other applications.

BACKGROUND OF THE INVENTION

A drill string is typically composed of a large number of drill rods or casings which are threaded together incrementally as the drilling progresses. The joints of the drill string serve to transfer torque to the core barrel and diamond drill bit, allowing the drill string to machine its way through the formation as the upper end is rotated. As the drill string increases in length, the total drill string weight will in time exceed the required axial (downward) drilling force and an opposite 'pullback force' is required to maintain the desired axial force at the drill bit. This increases tension on the drill string and imposes an axial load on the joints. Hence, drilling deep holes can require resilient joints with significant tension and torque load capacities. These drill rods and casings will typically be used repeatedly (joint make-up and joint break-out) throughout their useable life, and so the joint must also be capable of withstanding fatigue and premature wear. The joint make-up and break-out should be quick, relatively simple and safe to ensure productivity goals are reached.

The joint should also be relatively water tight to ensure that the drilling fluid that is pumped down the drill string (for the purpose of cooling, lubricating and flushing) is efficiently delivered to the drill bit without bleeding off through unsealed joint unions. A drill string is often not perfectly straight along its full length, sometimes on purpose (wedging off an existing bore hole) but most of the time due to physics. In these cases, the drill string is subjected to alternating forces (eg. lateral forces) and the threaded joint may require additional strength at the joints to prevent failure due to fatigue stress.

Preferably the joint should be threaded together (made-up) with the proper amount of torque (joint pre-torque). Proper joint pre-torque involves threading together the box and pin threads at a moderate rotational rate to a predetermined torque level. Larger diameter drill rods and casings will require higher pre-torque levels.

It is of importance that during use, the joint doesn't become inwardly flared (inside diameter ("ID") reduction) nor outwardly flared (outside diameter ("OD") belling) during the normal working life of the drill rod or casing. This is of importance due to the fact that associated tooling is continually being passed through the ID of the drill rods and casings in order to extract core samples. Also, cuttings are continually being flushed from the drill bit to the collar at the drill rig, between the OD of the drill string and the bore hole ID, so any belling outwards of the box thread OD can compromise this flow, creating potential problems. Increased wear could also result from OD belling of the joint.

Compared to the oilfield exploration industry, drill rods and casings used in the mineral exploration industry tend to have a thinner wall thickness due to the fact that, as previous noted, coring tooling must be able to pass through the drill string. Coring tooling includes devices such as core extraction devices, down hole surveying instrumentation, as well as recovery tools. The goal of the system as a whole is to extract the largest possible diameter of core from a given bore hole size.

Drill rods and casings used in the mineral exploration industry are typically thin walled steel tubes consisting of female and male threads (box and pin threads respectively) located at axially opposing ends and sharing a common central axis (in the case of straight tubes). An internal cylindrical surface extends axially between the base shoulder of the box thread and the nose shoulder of the pin thread. In some cases, internally upset tubing is used instead of simple tubing whereby the internal cylindrical surface transitions from a smaller diameter at each end to a slightly larger diameter in the mid-body. This specialized tubing allows for a weight reduction when drilling deep holes relative to more conventional thicker walled tubing.

SUMMARY OF THE INVENTION

In one aspect, the present invention relates to a threaded joint that is suitable for coupling together members such as tubes or rods. In one aspect, the joint is suitable for relatively thin-walled tubes such as those used for mineral exploration. The joint comprises a box thread and a pin thread provided at the ends of tubes or rods. The box and pin threads have primary and secondary thread geometries, described in more detail herein. The primary geometry includes a pressure flank configuration that imparts axial and torsional loading capacities of the joint. The secondary geometry includes the geometries of tapered (frustroconical) surfaces defined by the crest and root respectively of the threads, extending between the nose and base of the respective box and pin threads. The secondary geometries differ between the box and pin threads to generate an interference fit when threaded together, as described herein.

In one aspect, the invention relates to a threaded joint comprising a box thread and a pin thread. The box thread comprises a box thread root, a box thread crest, a box thread pressure flank and a box thread clearance flank. The box thread comprises a helix having a central axis C, wherein:

said box thread root and box thread crest define frustoconical surfaces having an angle of taper T1 relative to axis C; and said box thread pressure flank comprises a surface having an angle PF1 relative to axis C of between 88° and 95°.

Furthermore, the pin thread comprises a pin thread crest, a pin thread root, a pin thread pressure flank and a pin thread clearance flank. The pin thread comprises a helix having a central axis C which is co-axial with box thread axis C when threaded together, wherein, said pin thread root and box thread crest define frustoconical surfaces having an angle of taper T2 relative to axis C; and said pin thread pressure flank comprises a surface having an angle PF2 relative to axis C of between 88° and 95°; and wherein:

said angle PF1 differs from said angle PF2, or said angle T1 differs from said angle T2, or said angle PF1 differs from said angle PF2 and said angle T1 differs from said angle T2.

In one aspect, angle T1 differs from angle T2 by an angle which may be: 0.05° to 0.5°; 0.05° to 0.25°, or about 0.09°. The angles T1 and/or T2 may be: 0.3° to 4.0°, 0.5-3.0°, about 2.0° or about 2.2°.

Angles PF1 and/or PF2 may be: in the range of 90.5° to 92°; 91-91.5° or about 91.1°. Furthermore, PF1 may differ from PF2 by: 0.05° to 0.5°; 0.1° to 0.4°; or 0.2° to 0.25°.

In a further aspect, T1 may less than T2 and/or PF1 may be less than PF2.

In another aspect, the respective thread depths of said pin and box threads may differ from each other.

In another aspect, the box thread clearance flank comprises an angle CF1 relative to axis C and the pin thread clearance flank comprises an angle CF2 relative to said axis C, wherein said angles CF1 and CF2 are the same or different from each other and are: in the range of 44° to 48°; 45° to 47° or about 46.1°. Furthermore, PF1 may differ from PF2 by about 0.09° and/or CF1 may differ from CF2 by about 0.09°.

According to a further broad aspect, the invention relates to a threaded joint comprising a box thread and a pin thread, said box thread comprising a box thread root, a box thread crest, a box thread pressure flank and a box thread clearance flank, said box thread comprising a helix having a central axis C, wherein said pin and box threads are configured whereby when threaded together a first portion of the root of said pin thread is out of contact with of contact a portion of the crest of said box thread to leave a gap therebetween, and second portions thereof are in contact by an amount sufficient to generate an interference fit between the pin and box threads.

The secondary geometries of the box and pin threads provide constant geometric profiles oriented along respective tapers at the ends of the tube. This geometric thread profile varies between the box and pin threads in terms of thread depth, deburred depth (the depth of the chamfer or radius that is provided between the respective flanks and the crests of each thread) and taper angle, although these features are constant for the given end (i.e. the box thread depth remains constant along its tapered helical path but differs from the pin thread depth). The presence of arcuate chamfer and radius surfaces (i.e. curved convex and concave surfaces) as described herein prevents galling or other undesirable effects from occurring in use. The box and pin thread geometries oriented between frusto-conical surfaces are such that a portion (but not the entirety) of the pin thread crest and box thread root are in contact when threaded and a portion thereof is out of contact, wherein an interference fit results when threaded together. In this configuration, the box thread crest and pin thread root make no contact when threaded together and contain a frusto-conical radial gap. The pressure flanks on both the box and pin threads are oriented at an angle which is normal to the taper of the thread (i.e. the conical surfaces defined by the crest and root surfaces) allowing forces to be transferred in an efficient manner (in some cases up to 99.98% of the force component is axial). The clearance flanks on both the box and pin threads are oriented at about 45° to the taper of the thread, allowing the threads to withstand damage from stabbing during thread make-up.

According to a further aspect, the invention relates to a cylindrical member having a threaded joint comprising opposing first and second ends and an axis extending between said ends. The first end of the member includes a box thread and the second end includes a pin thread, such that the member may be threaded to additional members on each end thereof having corresponding threading. The box and pin threads are defined as follows:

a) said box thread comprises a helical thread having pressure and clearance flanks, a crest and a root, the box thread having a primary geometry wherein a pressure flank angle between said pressure flank and said axis is in the range of 90° to 93° and a secondary geometry wherein the crest and root define nesting frustoconical surfaces that are essentially parallel to each other and which taper inwardly towards the end of said member at a box thread taper angle of about 0.3° to 4° from said central axis;

b) said pin thread comprises a helical thread having pressure and clearance flanks, a root and a crest, the pin thread having a primary geometry wherein a pressure flank angle between said pressure flank and said crest differs from the box thread pressure angle and is in the range of 90° to 93° and a secondary geometry wherein the crest and root of said pin thread define nesting frustoconical surfaces essentially parallel to each other and tapering inwardly towards the end of said member at a pin thread taper angle which differs from the box thread taper angle and which is about 0.3° to 4° relative to said axis; and c) said pin and box threads are configured whereby when threaded together in corresponding cylindrical members a first portion of the crest of said pin thread is in contact with the root of said box thread a second portion thereof is out of contact to leave gap therebetween and the secondary geometries of the pin and box threads are configured to generate an interference fit between the pin and box threads.

Preferably, the respective thread depths of said pin and box threads differ from each other.

The box thread taper angle may be less than the pin thread taper angle, for example such that the difference between the box thread taper angle and the pin thread taper angle is in the range of 0.05° to 0.5°.

The cylindrical member may be heat treated, for example by a single heat treatment.

The cylindrical member may comprise a hollow tube having a wall thickness at said end region which is 0.135 to 0.265 inches in thickness and essentially consistent throughout the two end regions. The tube may comprise one of: a drill rod wherein the maximum threaded axial length is no longer than 2 inches and an axial pitch of no less than one sixth of an inch and a secondary profile taper relative to the longitudinal axis of no less than half of one degree or a casings wherein the maximum threaded axial length being no longer than 3 inches and an axial pitch of no less than one sixth of an inch and a secondary profile taper relative to the longitudinal axis of no less than one half of one degree. The outside diameter of the drill rod or casing may fall within mineral exploration industry standard dimensions (1.75 in to 6.5 in). The inside diameter of the drill rod or casing may fall within mineral exploration industry standard dimensions (1.375 in to 6.25 in).

According to another aspect, the invention relates to a threaded cylindrical member having opposing first and second ends and a central axis between said ends. The first end comprises a pin thread comprising a helical thread having pressure and clearance flanks, a crest and a root. The said second end comprises a box thread comprising a helical thread comprising pressure and clearance flanks and a root. The pin and box threads are configured whereby when threaded together at least a first portion of the root of said pin thread is out of contact with the crest of said box thread to leave gap therebetween and a second portion thereof is in contact by an amount sufficient to generate an interference fit between the pin and box threads. According to this aspect, the surfaces of said crests and said roots define conical frustrums wherein the conical frustrums of said crests or said roots or both of said crests and said roots preferably differ in angular degree from each other relative to said central axis as between the box and pin threads.

The pin and box threads further comprise clearance flanks opposed to said pressure flanks, said pin and box threads being configured wherein the pressure flank of a first of said members is out of contact with the clearance flank of a second of said members when coupled together.

The angle of the clearance flanks of said box and pin threads may differ from the pressure flank angle by a range of 37° to 57°.

According to another aspect, the invention relates to a drilling system or kit for subsurface drilling into a formation comprising a plurality of the cylindrical members as described herein, and a torque-applying member for rotating said cylindrical members when coupled together into a drill string. The kit or system may further comprise a core barrel for securing diamond cutting tools, one or more drill bits, and mechanical components for rotating the drill string and applying longitudinal pushing or pulling forces to the drill rods.

The invention further relates to a cylindrical member comprising the pin thread and/or the box threads as described herein. The invention further relates to a drilling system for subsurface drilling into a formation comprising a plurality of said cylindrical members.

The invention further relates to a thread cutting tool for cutting or otherwise forming a thread in a cylindrical member configured to form the pin or box thread as described herein, as well as a method for fabricating said pin and box threads by using said tool in a conventional manner.

In the present specification, the following definitions apply unless otherwise specified or the context suggests otherwise:

"tube" a member that is essentially cylindrical in cross section, having either a solid or hollow core, and which may threaded at its ends for coupling together "box thread": a female thread which is normally recessed into the inside surface of a tube "pin thread": a male thread which normally protrudes from the outside surface of a tube "pressure flank": a flank of a pin or box thread extending between the crest and root of the thread which bears against an opposing pressure flank when the respective threads are under tension "clearance flank": a flank of a pin or box thread extending between the crest and root of the thread which opposes the pressure flank and is not under compression when the respective threads are under tension "crest": a generally flat surface of a thread between the pressure and clearance flanks, which is outwardly protruded from the root "root": a generally flat surface of a thread between the pressure and clearance flanks, which is inwardly recessed from the crest "radius": a concavely curved surface between a flank and a root of a thread "chamfer": a convexly curved surface between a flank and a crest of a thread "primary geometry": the dimensions of a thread that relate to the cross-sectional profile of a single thread, in particular the dimensions of the respective flanks, crest and root of a thread "secondary geometry": the dimensions that relate to the degree of taper of a thread along its length, for example the angle defined between a central axis of the thread and a frusto-conical (tapering) surface defined by the crests or roots of a thread.

"interference fit" refers to a mode of retention between box and pin threads when the threads are retained by friction generated by contact between respective surfaces of the pin and box threads. Typically, the pin and box threads are configured to apply a compressive force between the respective threads when threaded together. Typically, the compressive force is concentrated on regions of the respective threads that are in contact, whilst other regions of the threads are out of contact or when threaded together or do not apply a compressive force against each other.

Directional references herein, such as "upward", "horizontal" and the like are used purely for convenience of description. It will be evident that the components described herein may be oriented in any direction.

DETAILED DESCRIPTION

Figure 1:
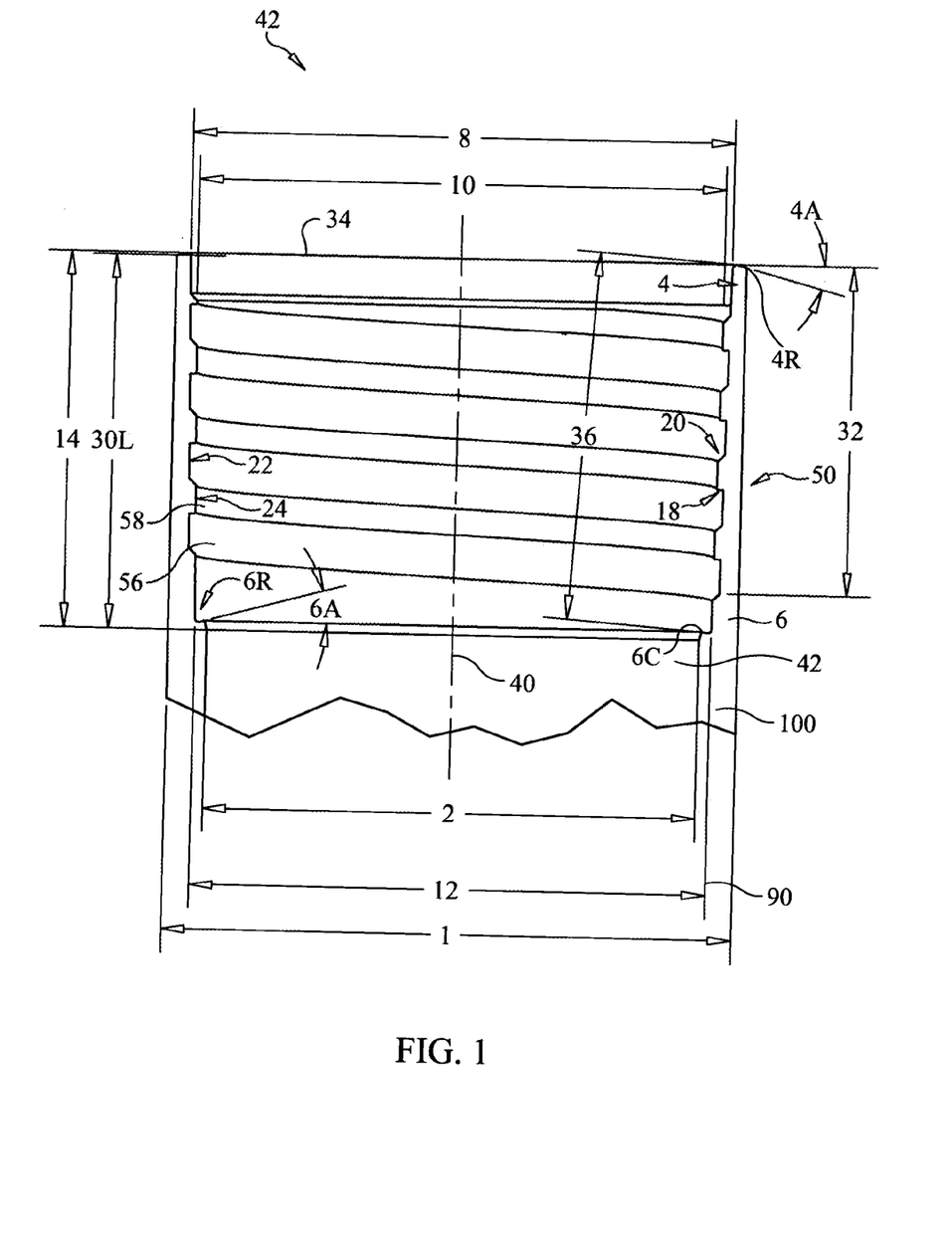
FIG. 1 is a partial sectional view of a box thread portion of the threaded joint according to an embodiment of the invention.
Figure 2:
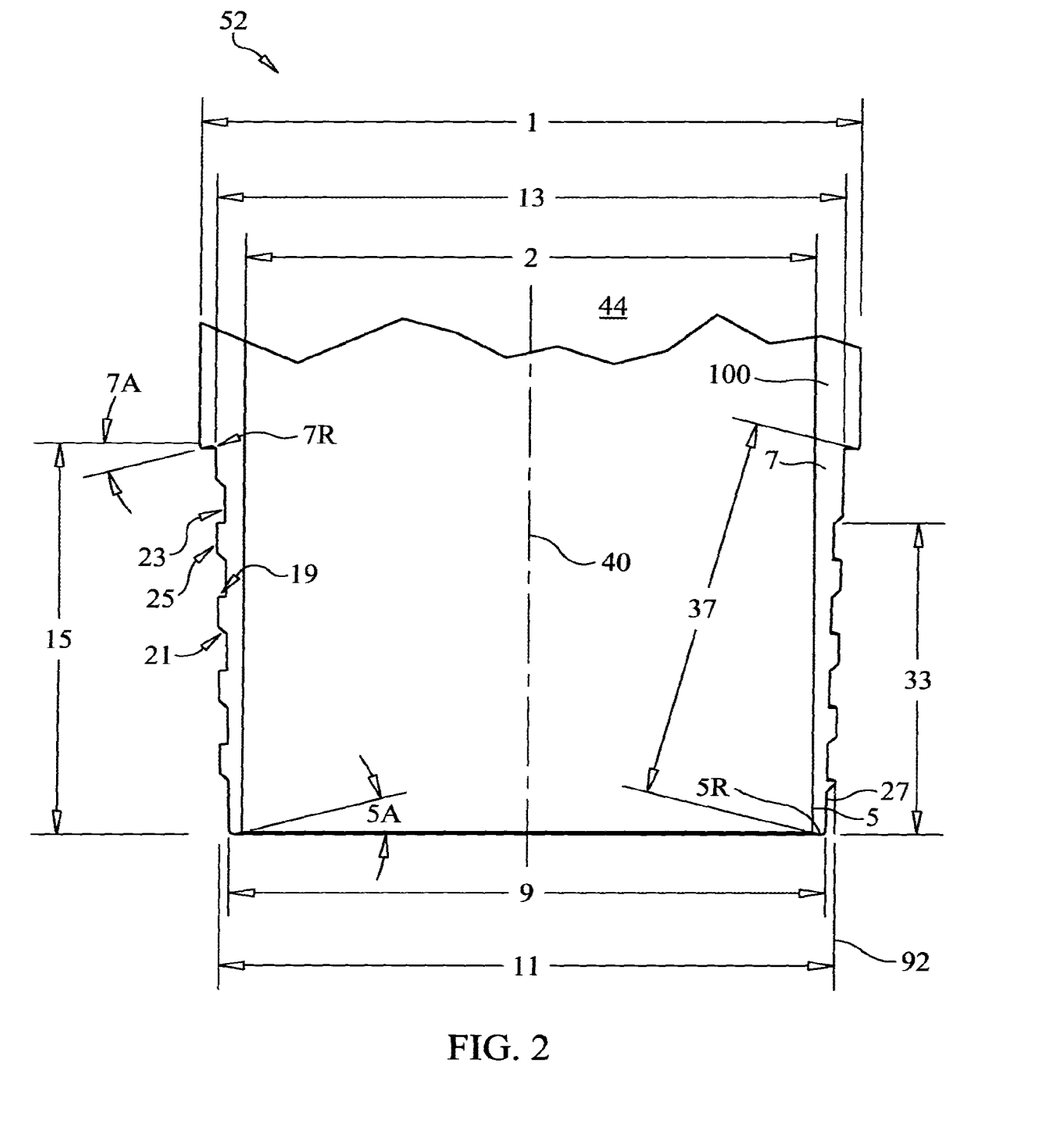
FIG. 2 is a partial sectional view of a pin threading of the threaded joint.
Figure 3:
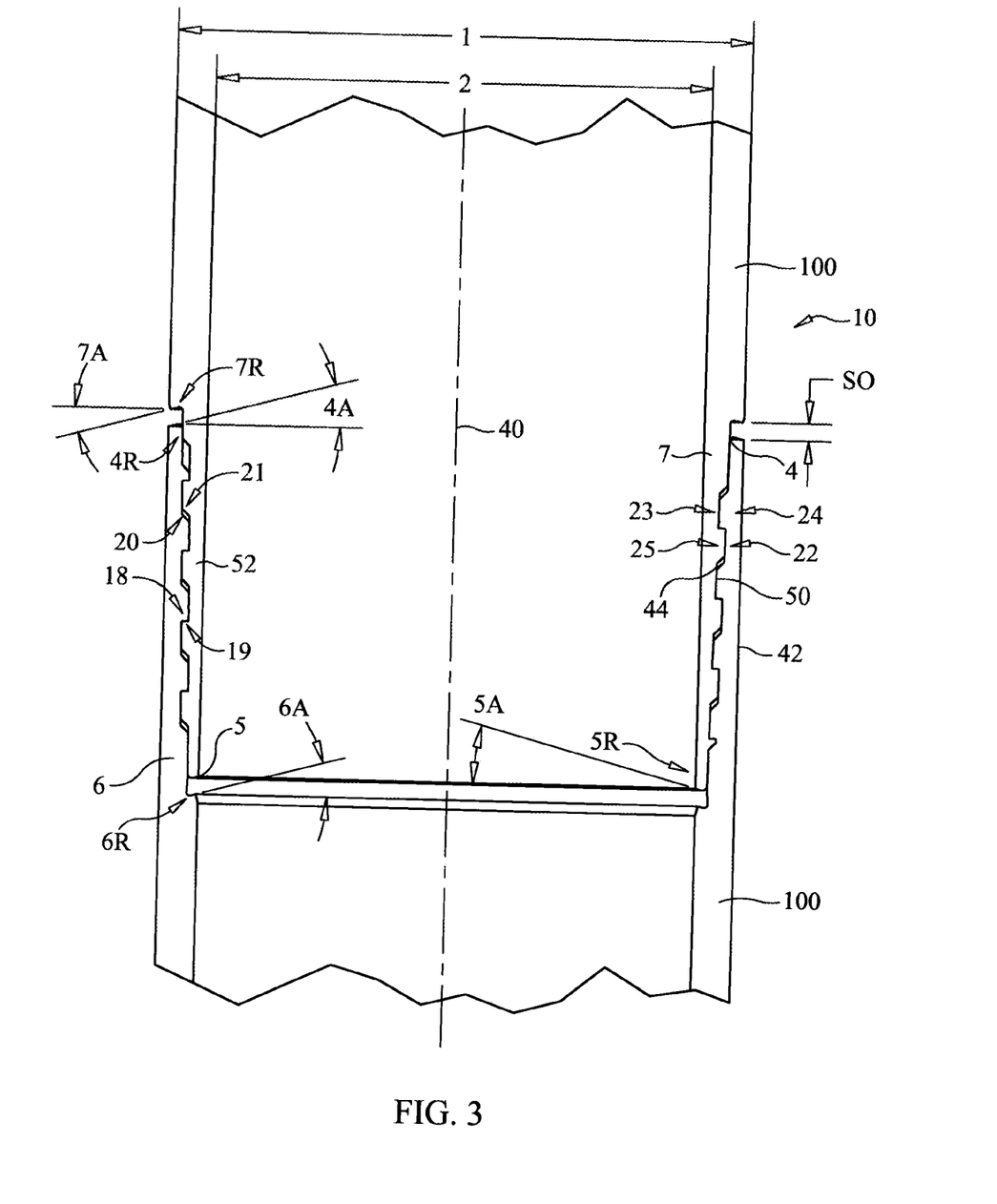
FIG. 3 is a partial sectional view of the box and pin threads of the joint in a partially coupled configuration.

Referring to the figures and in particular FIG. 3, a threaded joint 10 according to one embodiment of the invention comprises mutually engaging box and pin threads 50 and 52 provided on respective ends of tubes 100, which may comprise for example drill rods or casings. It will be seen that the invention may be adapted for coupling together various types of rods, tubes or the like having a variety of industrial applications. Tubes 100 have opposing end regions 42 and 44 with a central (primary) axis 40 extending between the ends. A first end region 42, seen in FIG. 1, is provided with box thread 50 and the opposed end region 44 seen in FIG. 2 is provided with pin thread 52. For convenience, both of the box and pin threads described herein are considered to share axis 40 as their respective central axes, although it will be seen that tube 100 need not be linear. However, for convenience of description it will be assumed for purpose of this embodiment that tube 100 is linear.

Typical uses of tube 100 include subsurface drilling into a formation, for example for obtaining a core sample. Tube 100 may comprise a welded or seamless steel tube, such as a straight, concentric, heat treated steel tube. The threaded joint 10 consists of a female (box) thread 50, as seen in FIG. 1, on the first end region 42 of tube 100 and a male (pin) thread 52 on the opposing end 44 of an adjacent tube 100 as seen in FIG. 2. Each tube 100 is normally provided with a box thread 50 and a pin thread 52 at the respective ends 42 and 44 thereof, wherein a plurality of similar tubes may be coupled into an essentially linear tube string. It will be seen that tube 100 may be non-linear (i.e. the central axis 40 being arcuate, provided with an elbow or otherwise non-linear), for example to provide an arcuate pipe string when assembled. As well, a tube 100 may be provided with only a single one of box thread 50 or pin thread 52, for example if the opposing end of the tube is configured to couple to a rotary driver, drill bit or other component.

The outside diameter (OD) 1 of tube 100 is greater than the maximum OD of the box thread 50 and the inside diameter (ID) 2 of tube 100 is less than the minimum ID of the pin thread 52. The OD 1 and in some cases ID 2 of tube 100 can be determined by industry standards. In one example, the minimum ID is 1.375" and the maximum OD is 6.500". The ID dimension of a drill rod or casing can vary between systems that share a common bore hole size, for example, depending on whether tube 100 is a standard wall drill rod or a thin wall drill rod. Coring tools that are of a standard size in the mineral exploration industry should be capable of passing freely and uninterruptedly through the ID of the entire drill string. Typically, casings have a thicker mid-body wall than drill rods, as they are normally used to create an uninterrupted, straight, link between the drilling equipment and solid bedrock, passing through very unpredictable overburden, sometimes consisting of boulders and broken ground. This robust casing acts as protection for the drill rods, while maintaining the hole direction as well as directing drilling fluid (complete with cuttings) through the annulus between the drill rod OD and casing ID, back to the bore hole collar, thus preventing the ground from washing out adjacent to the drilling equipment.

Box thread 50 and pin thread 52 both comprise a single start configuration wherein threads 50 and 52 each comprise an uninterrupted, constant tapered helical thread having a central axis 40. Box and pin threads 50 and 52 each comprise crests 24, 25 respectively and roots 22, 23 respectively. The respective roots and crests define frustoconical surfaces which taper relative to axis 40. As described below, the angles of taper of the respective box and pin frustoconical surfaces differ as between the box and pin threads. The box and pin threads 50 and 52 are pitched between 2.5 and 6 threads per axial inch, taken parallel to axis 40. The selected thread pitch is common to both of box and pin threads 50 and 52. Proximal and distal terminations of both box and pin threads 50 and 52 are common and parallel; these comprise surfaces that may be angled from 10° to 20° from a plane perpendicular to axis 40.

The secondary geometry configurations of box and pin threads 50 and 52 will induce interference when threaded together by contact between a portion of the crest of the pin thread and a corresponding portion of the root of the box thread. Portions of the surfaces of the box and pin threads remain out of contact when threaded together, in particular a portion the helical surface of the crest of the pin thread and the adjacent helical surface of the root of the box thread as well as the entire helical surfaces of the box crest and pin root. Surfaces that are spaced apart can serve as an integral volume for lubricants, sealants, coolants and debris.

Figure 5:
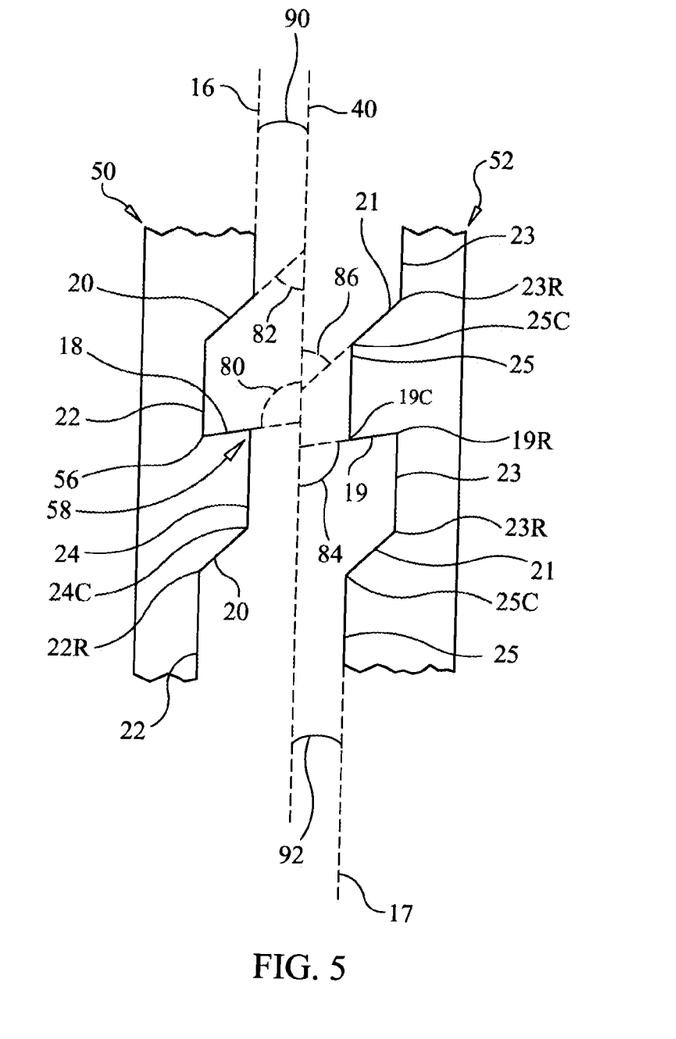
FIG. 5 is a partial cross sectional view showing detailed views of portions of the box and pin threads of the joint.

Referring to FIGS. 1, 3 and 5, box thread 50 comprises a primary geometry, namely a thread profile having a cross-sectional configuration that comprises a pressure flank 18, a clearance flank 20, a root 22 and a crest 24, all of which comprise essentially flat surfaces. The angle 80 of pressure flank 18 relative to axis 40 is within the range of 90.5° to 92°, preferably 91-91.5° and still more preferably 91.1°. Angle 82 of clearance flank 20 relative to axis 40 is in the range of 44° to 48°, more preferably 45-47° and most preferably 46.1°.

Figure 4:
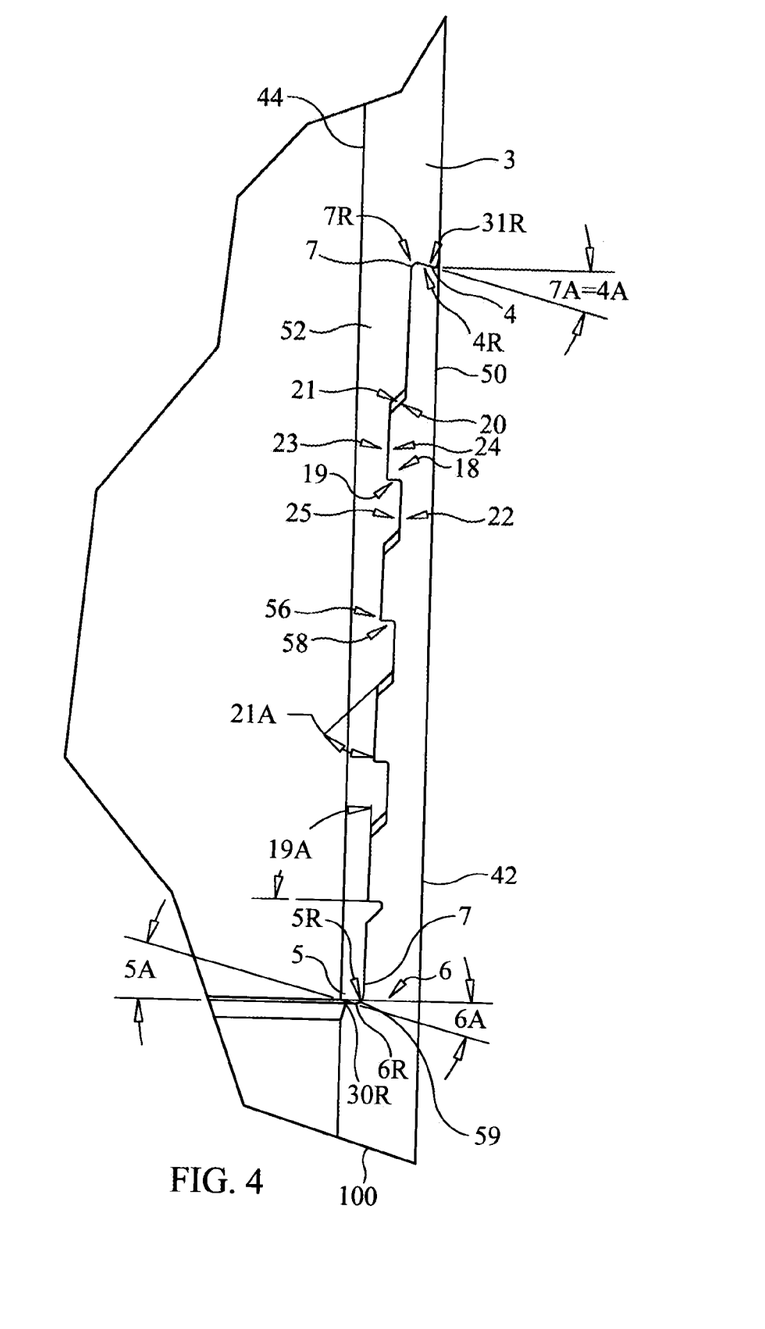
FIG. 4 is a partial sectional view showing a detailed view of the joint components wherein the box and pin threads are completely threaded together (fully made up).

Referring to FIGS. 4 and 5, pressure flank 18 meets root 22 at a concavely curved box base radius 56 and meets crest 24 at convexly curved box nose chamfer 58. Clearance flank 20 meets root 22 at a concavely curved radius 22R and flank 20 meets crest 24 at a convexly curved chamfer 24C. The proximal end of box thread 50 comprises a shoulder flank 6 comprising a surface having an angle of 75° relative to axis 40. Shoulder flank 6 meets the adjacent box root 22 and box base radius 59, which has an arcuate cross section. The distal end of box thread 50 comprises an end flank 4 at the distal end face of box thread 50. End flank 4 comprises a frusto-conical surface with a taper angle 4A of 0.5° to 1.5° relative to axis 40 (angle 4A).

First end region 42 further comprises a proximal unthreaded segment 7 at its proximal end adjacent to the body of tube 100. Unthreaded segment 7 comprises a shoulder 30R at the proximal end of segment 7. Shoulder 30R comprises an angled surface having an angle 5A relative to axis 40, which angle equals angle 6A of corresponding nose 5 of pin thread segment 52. Shoulder 30R further comprises a chamfered edge to provide an annular internal groove where the pin and box segments meet.

Box thread 50 further comprises a secondary geometry comprising the frustoconical configuration of its root and crest surfaces 22 and 24. As seen in FIG. 1, box thread 50 tapers uniformly from a maximal (major) thread diameter 10 (i.e. the ID taken between opposing portions of crests 24) at the proximal end thereof to a minimal (base) diameter 12 at the distal end thereof along its secondary profile length 14 (i.e. actual thread length 32 of box thread 50). Box thread crests 24 are aligned so as to define a frusto-conical surface that is uniformly tapered and which defines a first conical frustum. Box thread root 22 is defined by a uniformly tapered conical frustum which effectively nests within the first conical frustum. The first and second frustrums of box thread 50 are parallel to each other and thus the respective taper angles of the surfaces of root and crest 22 and 24 are identical.

As seen in FIGS. 1 and 5, box thread 50 thus defines a secondary axis 16 parallel to the crests 24 and roots 22 thereof, which is at an angle relative to primary axis 40. Secondary axis 16 is thus parallel to the two conical frustrums that define the essentially flat surfaces of box thread crest 24 and box thread root 22. The angle between axis 16 and axis 40 defines a taper angle 90 of box thread 50 that may be in the range of 0.3-4°, preferably 0.5-3°, and most preferably 2.0°.

As seen in FIG. 1, box thread 50 has an effective thread length 32 extending from the base of the helical groove (proximal end) to its distal end measured along an axis parallel to primary axis 40. Box thread 50 has an actual thread length 36, an effective total segment length 14 measured from radius 6R of shoulder 6 to nose 4A, and an effective length 30L from chamfer 6C of shoulder 6 to nose 4A.

According to one embodiment, the actual and effective thread lengths and taper angles of the box threads relative to axis 40, are as follows: Box thread length 14=1.750", Effective thread length 32=1.645", Taper angle 90=2.0°.

Referring to FIGS. 2 and 5, pin thread 52 comprises a root 23, a crest 25, a pressure flank 19 and a clearance flank 21, all of which comprise essentially flat surfaces. Pressure flank 19 meets root 23 at a concavely curved radius 19R and meets crest 25 at a convexly curved chamfer 19C. Clearance flank 21 meets root 23 at a concavely curved radius 23R and meets crest 25 at a convexly curved chamfer 25C. End region 44 terminates at its distal end in an unthreaded nose segment 27 which when threaded with the box thread 50, overlies unthreaded box segment 7.

Pin thread 52 comprises of a primary geometry, namely a thread profile having a cross-sectional configuration defined by the cross-sectional dimensions of pressure flank 19, clearance flank 21, root 23 and crest 25. Clearance flank 21 is defined by a surface having an angle 84 relative to central axis 40 which is in the range of 44° to 48°. More preferably, angle 84 is 45-47° and most preferably 46.1°. Pressure flank 19 is defined by a surface having an angle 86 relative to central axis 40 which is in the range of 90° to 93°. More preferably, angle 84 is 90.5 to 92° and most preferably 91.1°. Angles 84 and 86 of pressure flank 19 and clearance flank 21 relative to axis 40 differ from the corresponding angles 80 and 82 of pressure and clearance flanks 18 and 20 of box thread 50. This difference may comprise 0.09° nominally.

Root 23 of pin thread 52 has an axial dimension of 0.165" between flanks 19 and 21, which contrasts with the shorter axial dimension of 0.136" of crest 24 of box thread 50. As well, crest 25 of pin thread 52 has an axial dimension of 0.133", which contrasts with axial dimension of 0.165 of root 22 of box thread 50. As a result, when the box and pin threads are coupled wherein the respective pressure flanks 18 and 19 are in contact, as seen in FIGS. 3 and 4, the respective clearance flanks 20 and 21 are out of contact with each other to leave a gap therebetween.

Pin thread 52 further comprises a secondary geometry wherein the thread profile is swept along a uniformly tapered helical path similar to that of box thread 50. As seen in FIG. 5, pin thread 52 defines a secondary axis 17 parallel to the crests and roots thereof, which is at an angle of 2.2° relative to primary axis 40. Secondary axis 17 is thus parallel to the two nesting conical frustrums that define the essentially flat surfaces of pin thread crest 25 and pin thread root 23. The angle between axis 17 and axis 40 defines a taper angle 92 of box thread 50 that may be in the range of 0.4° to 4°, preferably 0.6° to 3°, and most preferably 2.2°.

According to one embodiment, the actual and effective thread lengths and taper angles of the pin threads relative to axis 40, are as follows: actual thread length 35=1.750"; effective thread length 33=1.645" and taper angle 92=2.2°.

According to one embodiment, an effective range for the thread taper angles 90 and 92 are based on controlling three other dimensions (2 diametric and 1 linear) to tolerances of +/−0.0005.

The box thread may have a taper angle 90 that is less than the pin thread taper angle 92.

The taper angles 90 and 92 of the respective box and bin threads 50 and 52 differ from each other within a range of 0.05° to 0.25°. In one example, angles 90 and 92 differ by the same value as the difference in values between corresponding flanks as between the pin and box threads, which may be 0.09° in one example. In another example, the root/crest surfaces 22 and 24 of box thread 50 are tapered at 0.5° from axis 40 and the root/crest surfaces 23 and 25 of pin thread 52 are tapered at 0.75° from axis 40.

The difference in the respective taper angles 16 and 17 serves to induce interference and thread standoff (SO) between shoulders 4 and 7 of the box and pin respectively, when threads 50 and 52 are coupled together and fully made up as indicated in FIG. 3 wherein the box and pin threads are threaded together. This inherent interference is also a function of the geometric features of the box and pin dimensions such as the box thread major diameter 8, pin thread major diameter 9, box thread secondary profile length 14 and pin thread secondary profile length 15, showing these components threaded together to the point of standoff due to inherent interference resulting from the partial contact between the pin and box thread root/crest respectively.

The distal end of pin thread 52 is defined by a nose 5, which comprises a frusto-conical surface 5A having a taper angle 6A of 1.1° relative to axis 40. The taper of surface 5A is substantially identical to the box taper angle 6R whereby these respective surfaces may abut when the box and pin threads are coupled. Surface 5A meets the distal-most root 23 at a radius 5R. The proximal end of pin thread 52 is defined by a shoulder 7 having a frustoconical surface 7A. Surface 7A has an angle relative to axis 4 of about 75°, which essentially corresponds to the angle of box thread end flank 4A. Surface 7A meets the adjacent crest 25 at a chamfer 7R.

Referring to FIGS. 1 and 2, a representative geometry that generates an interference fit between the box and pin threads 50 and 52 includes selected Major and Minor Diameters at the end face (dimensions 8, 9, 10, 11), Thread Lengths (14,15) and base diameters (12, 13) as follows:
Dimension 8—Box thread distal ID at root: 2.60"
Dimension 9—Pin thread distal OD at root: 2.50"
Dimension 10—Box thread distal ID at crest: 2.55"
Dimension 11—Pin thread distal OD at crest: 2.60"
Dimension 12—Box thread base ID at crest: 2.50"
Dimension 13—pin thread base OD at crest: 2.60"
Dimension 14—length of box thread: 1.80"
Dimension 15—length of pin thread: 1.80".

As noted above, these dimensions yield a differential in thread taper as well as an interference fit when threaded together. The practical benefits of having an interference fit are: A) it ensures that the joint is pressure sealed (for use with drilling fluids) and B) it ensures that the joint will not be vulnerable to the effects of "spin-out" when drill string rotation is halted abruptly. An interference fit of the rod joints may reduce leakage that could otherwise lead to diamond drill bit failure and gumming the return flow, increased rod string vibration and undesirable induced harmonics as well as spin-out issues and premature wear at the joint.

FIG. 4 shows the pin thread 52 completely threaded and pre-torqued into the box thread 50, forming a sealed rod or casing joint. The standoff SO (shown in FIG. 3) has been reduced to zero by wrenching up two rods or casings with an applied torque. The Stand-Off is reduced to zero by applying torque to the joint by a mechanical means, and to a desired value. The box thread material physically deforms in the elastic range (albeit to a very small degree) and becomes stressed, squeezing inwards on the pin. The majority of the box thread deformation is diametric, with a lesser amount of compressed deformation.

When the respective box and pin threads are coupled, box nose flank 4A is forced into the equivalent pin base flank 7A, adjacent to the pin secondary base shoulder radius 31R. The relatively greater box nose radius 4R nests within the lesser pin base radius or chamfer 7R. The pin nose angle 5A remains stood out from the equivalent box base angle 6A, adjacent to the box secondary base shoulder radius 30R. The relatively greater pin nose radius 5R nests within the lesser box base radius 6. The pin thread is drawn in to the box thread when the loading is transferred from the clearance flanks of the box and pin, 20 and 21 respectively, to the pressure flanks of the box and pin, 18 and 19 respectively, upon make-up of the joint due to rotating one rod or casing relative to the other by applying torque, normally with a pipe or rod wrench. The inherent interference between the box and pin thread increases as the joint stand-off SO decreases during this make-up phase. A helical portion of the box thread root 22, normally interferes with an equivalent portion of the pin thread crest 25 while being driven by the pressure flank surfaces of the box and pin, 18 and 19 respectively with the box thread root radius 22R being clear of the pin thread crest chamfer 25C. The gap between the entire box thread crest 24 and pin thread root 23 normally remains essentially clear and can serve as a volume for thread lubricant, thread sealant or debris.

Drill rods and casings of this invention incorporate may be fabricated from conventional high quality materials and treated after the threads have been cut with a heat treatment operation to form a joint capable of withstanding significant tensile, compressive and torsional forces while resisting negative impact due to induced drill string harmonics, vibrations, temperature level and temperature variation, material fatigue, elevated pressure (burst and collapse) and wear over prolonged and repeated usage in unpredictable, normally harsh environments. The heat treatment process may comprise a low frequency induction process wherein prior to threading, the tubing is heated, quenched and tempered to achieve elevated mechanical properties at the compromised zone (threaded geometry) where the material will be less present through the section.

The scope of the invention should not be limited by the preferred embodiments set forth in the examples but should be given the broadest interpretation consistent with the description as a whole. The claims are not to be limited to the preferred or exemplified embodiments of the invention.

The invention claimed is:

1. A threaded joint comprising a box thread and a pin thread, said box thread comprising a box thread root, a box thread crest, a box thread pressure flank and a box thread clearance flank, said box thread comprising a helix having a central axis C, wherein:
    said box thread root and box thread crest define frusto-conical surfaces having an angle of taper T1 relative to axis C; and
    said box thread pressure flank comprises a surface having an angle PF1 relative to axis C of between 88° and 95°;
    said pin thread comprises a pin thread crest, a pin thread root, a pin thread pressure flank and a pin thread clearance flank, said pin thread comprising a helix having a central axis C which is co-axial with box thread axis C when threaded together, wherein,
    said pin thread root and box thread crest define frusto-conical surfaces having an angle of taper T2 relative to axis C; and
    said pin thread pressure flank comprises a surface having an angle PF2 relative to axis C of between 88° and 95°; and wherein:
    said angle PF1 differs from said angle PF2, or said angle T1 differs from said angle T2, or said angle PF1 differs from said angle PF2 and said angle T1 differs from said angle T2.

2. The threaded joint of claim 1 wherein said angle T1 differs from said angle T2.

3. The threaded joint of claim 1 wherein said angle T1 differs from said angle T2 by an amount which is 0.05° to 0.5°.

4. The threaded joint of claim 1 wherein said angle PF1 differs from said angle PF2.

5. The threaded joint of claim 1 wherein said angle PF1 differs from said angle PF2 and said angle T1 differs from said angle T2.

6. The threaded joint of claim 1 wherein T1 is less than T2.

7. The threaded joint of claim 1 wherein PF1 is less than PF2.

8. The threaded joint of claim 1 wherein the difference between PF1 and PF2 is the same as the difference between T1 and T2.

9. The threaded joint of claim 1 wherein T1 and/or T2 is between 0.3° to 4.0°.

10. The threaded joint of claim 1 wherein the respective thread depths of said pin and box threads differ from each other.

11. The threaded joint of claim 1 wherein T1 is in the range of 0.4° to 4.0°.

12. The threaded joint of claim 1 wherein T2 is in the range of 0.5-3.0°.

13. The threaded joint of claim 1 wherein PF1 is in the range of 90.5° to 92°.

14. The threaded joint of claim 1 wherein PF2 is in the range of 90.5° to 92°.

15. The threaded joint of claim 1 wherein PF1 differs from PF2 by 0.05° to 0.5°.

16. The threaded joint of claim 1 wherein said box thread clearance flank comprises an angle CF1 relative to axis C and said pin thread clearance flank comprises an angle CF2 relative to said axis C, wherein said angles CF1 and CF2 are the same or different from each other and are in the range of 44° to 48°.

17. The threaded joint of claim 16 wherein said angles CF1 and CF2 are in the range of 45° to 47°.

18. The threaded joint of claim 1 wherein PF1 differs from PF2 by about 0.09° and CF1 differs from CF2 by about 0.09°.

19. A cylindrical member comprising the pin thread and/or the box thread as defined in claim 1.

20. A drilling system for subsurface drilling into a formation comprising a plurality of the cylindrical members of claim 19.

21. A thread cutting tool for cutting a thread pattern into a cylindrical member configured to form the pin or box thread as defined in claim 1.

* * * * *